United States Patent [19]

Tarakad et al.

[11] Patent Number: 4,693,731

[45] Date of Patent: Sep. 15, 1987

[54] REMOVAL OF MERCURY FROM GASES

[75] Inventors: Ramanathan R. Tarakad; Duffer B. Crawford, both of Houston, Tex.

[73] Assignee: The M. W. Kellogg Company, Houston, Tex.

[21] Appl. No.: 923,462

[22] Filed: Oct. 27, 1986

[51] Int. Cl.⁴ .............................................. B01D 19/00
[52] U.S. Cl. ........................................... 55/72; 62/17; 62/24; 62/28; 55/88
[58] Field of Search .................. 55/72, 46–51, 55/88; 62/20, 17, 28, 27, 23, 24; 423/210

[56] References Cited

U.S. PATENT DOCUMENTS

| | | | |
|---|---|---|---|
| 2,355,167 | 8/1944 | Keith | 62/17 |
| 2,468,750 | 5/1949 | Guclenrath | 55/51 |
| 3,736,724 | 6/1973 | Wygasch | 55/29 |
| 3,793,806 | 2/1974 | Fornoff | 55/72 |
| 4,044,098 | 8/1977 | Miller et al. | 423/210 |
| 4,101,631 | 7/1978 | Ambrosini et al. | 423/210 |
| 4,370,156 | 1/1983 | Goddin et al. | 62/17 |

OTHER PUBLICATIONS

Bodle et al., "Considerations for Mercury in LNG Operations", presented at LNG-6 Conference, Session II.

*Primary Examiner*—Bernard Nozick

[57] ABSTRACT

Mercury is removed from natural gas by contacting the gas with a relatively mercury-free liquid state hydrocarbon and recovering a mercury-lean methane-rich gas and a mercury-enriched hydrocarbon liquid. The mercury-free hydrocarbon liquid may be obtained by separation of mercury from the mercury-enriched hydrocarbon liquid or its derivative streams.

14 Claims, 7 Drawing Figures

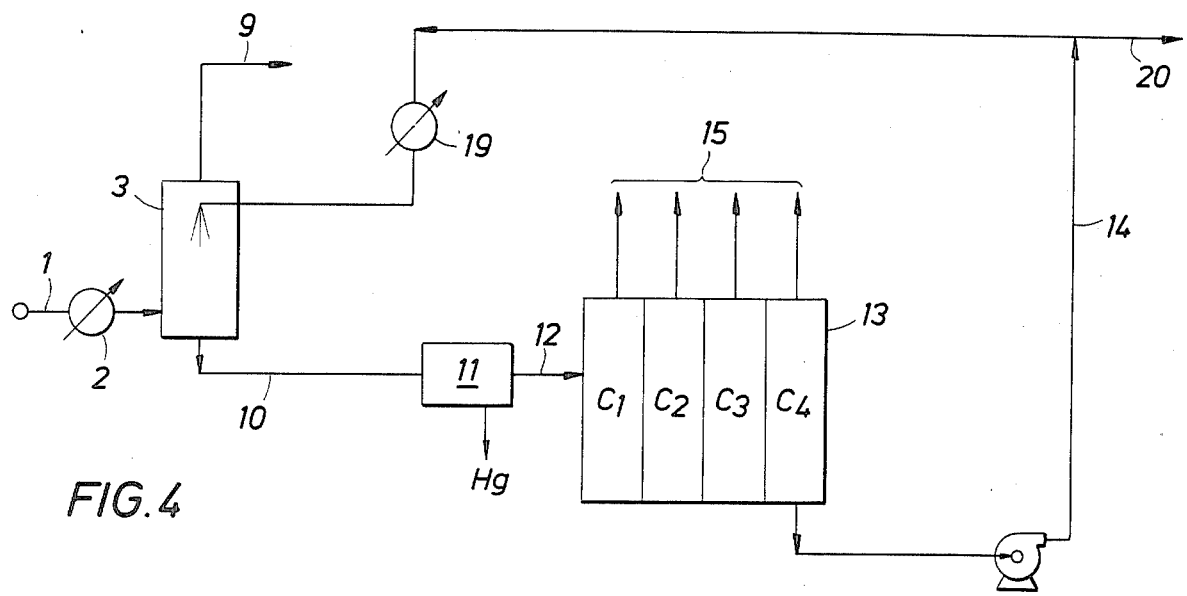
FIG.4
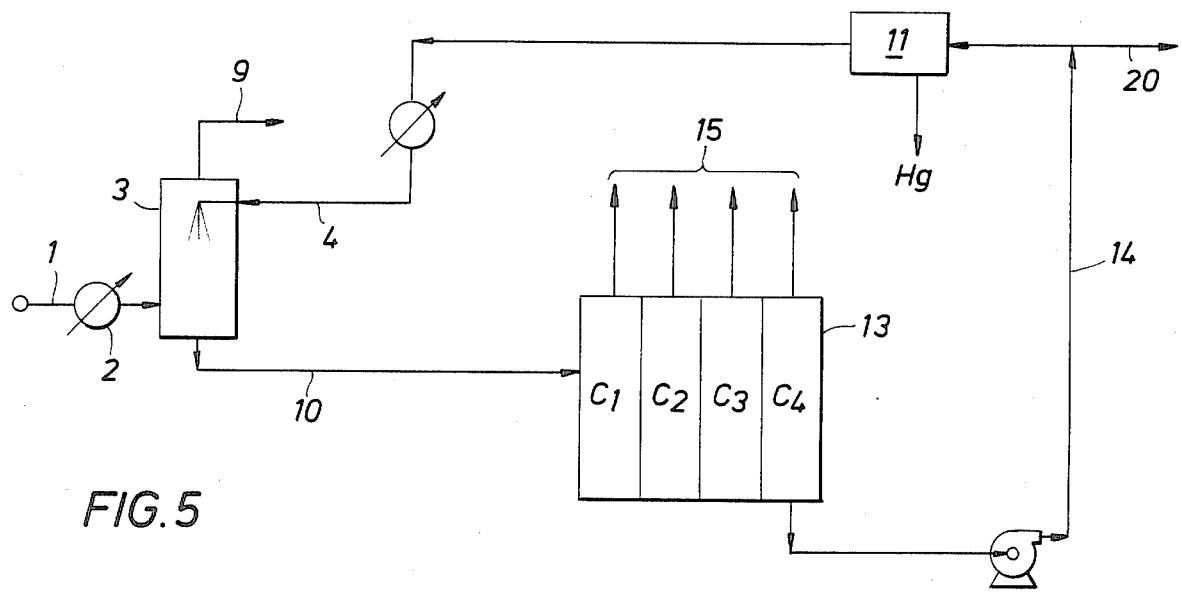
FIG.5
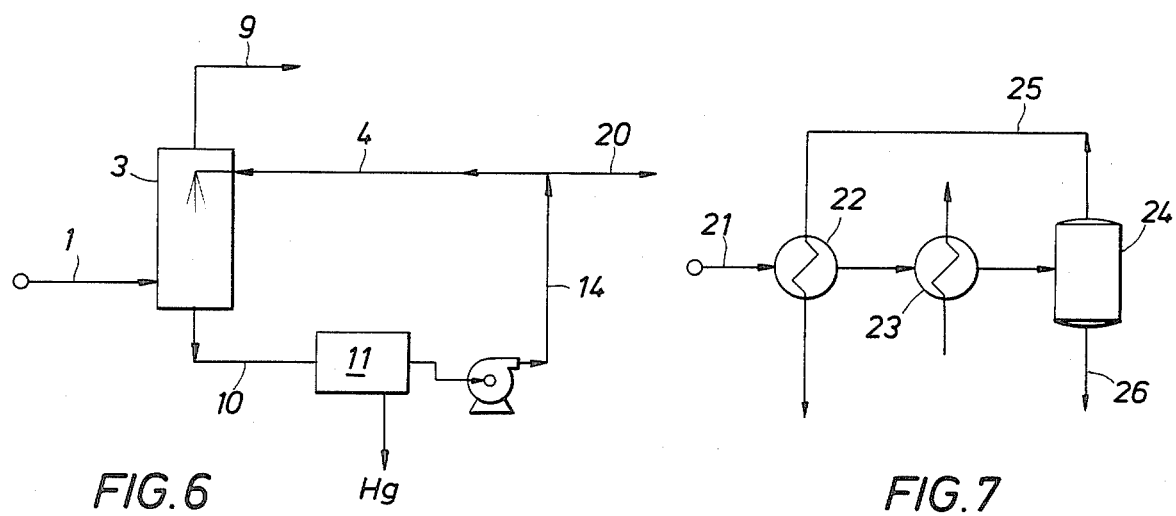
FIG.6
FIG.7

REMOVAL OF MERCURY FROM GASES

This invention relates to a process for removal of mercury from gases. More particularly the invention relates to removal of mercury from natural gas.

Mercury has been found in natural gas fields throughout the world in concentration ranging from a trace to as much as 1000 $\mu g/Nm^3$. While moderate to high concentrations of mercury can present specific industrial health problems and may poison certain catalysts used in natural gas-feed processes, it has been learned in recent years that even very low amounts of mercury in gas-feed cryogenic process plants cause corrosion in aluminum alloy equipment as the mercury accumulates in various items of equipment. Mercury-induced corrosion, particularly in the presence of water, has been known for some time but the specific corrosion mechanisms are not fully understood. Mercury removal from feed gas is, therefore, the only currently available remedy for the problem.

The most commonly used technique for mercury removal from natural gas at the present time employs gas treatment with sulfur impregnated activated carbon sorbent or proprietary sorbents. These dry, particulate sorbents are usually employed in the upstream gas treating sections of a cryogenic process plant and, when fresh, can remove mercury to a typical level of 0.1 $\mu g/Nm^3$. Sorbents must be replaced when mercury content of treated gas rises. While sorbent treatment is reasonably satisfactory in commercial practice, lower mercury content in the treated gas would significantly reduce the prospects of mercury-induced corrosion in cryogenic equipment. Other mercury removal techniques such as formation of various amalgams are known but are not useful where very low mercury contents are required.

It is an object of this invention to provide a mercury removal process capable of treating gas to very low levels of mercury content. It is a further object of this invention to provide a mercury removal process that does not require replacement of particulate sorbents.

According to the invention, natural gas containing mercury is contacted with a mercury-free hydrocarbon liquid having a molecular weight between 20 and 130 in a gas/liquid contacting zone from which a mercury-enriched hydrocarbon liquid is recovered and a mercury-lean methane-rich gas is recovered.

FIG. 4 is a flow scheme of another embodiment of the invention wherein a normally liquid hydrocarbon is employed as the first mercury-free hydrocarbon liquid in the gas/liquid contacting zone, mercury is separated from the contacting zone liquid effluent, and a portion of mercury-free gasoline recovered from a downstream LPG unit is recycled.

FIG. 5 is a flow scheme of another embodiment of the invention varying from FIG. 4 in that mercury is removed from the recycle gasoline stream.

FIG. 6 is a flow scheme of another embodiment of the invention varying from FIG. 4 in that LPG is not separated, warmer temperatures are employed, and mercury removal is not as complete as in previous flow schemes.

FIG. 7 is a flow scheme of another embodiment of the invention illustrating a preferred method of mercury separation by chilling the hydrogen stream.

Figure 1:
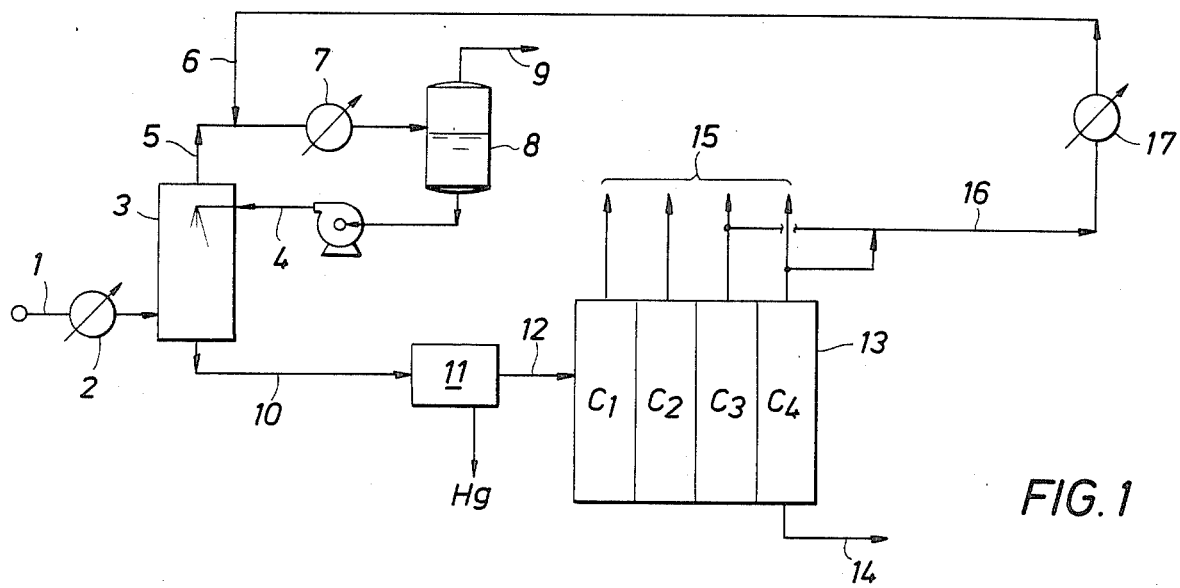
FIG. 1 is a flow scheme of an embodiment of the invention wherein a normally gaseous hydrocarbon is employed as the first mercury-free hydrocarbon liquid in the gas/liquid contacting zone, mercury is separated from the contacting zone liquid effluent, and a portion of LPG recovered from the resulting second mercury-free hydrocarbon liquid is recycled.

The first mercury-free hydrocarbon liquid used in the gas/liquid contacting zone may be principally a normally gaseous hydrocarbon or principally a normally liquid hydrocarbon. The phrase "mercury-free" is relative because of the low levels of mercury under consideration as well as the technical difficulty of measurement. As used herein "mercury-free hydrocarbon liquid" means a liquid phase hydrocarbon or hydrocarbon mixtures containing from 0 to 100 ppb (parts per billion by moles) mercury. For cryogenic services we prefer to employ mercury-free hydrocarbon liquids containing from 0 to 5 ppb mercury.

In a principal embodiment of the invention wherein at least a major portion of first mercury-free hydrocarbon liquid is normally gaseous as will typically be the instance in cryogenic process plants, we prefer to operate the gas/liquid contacting zone at a temperature between 10° C. and −85° C. In LNG plants where the gas entering the contacting zone is typically at a pressure between 17 and 105 $kg/cm^2a$, the primary mercury absorber overhead is typically operated at a temperature between 0° C. and −75° C. Preferably, the mercury-lean methane-rich gas leaving the primary absorber is further cooled to between −30° C. and −85° C. to condense additional hydrocarbons heavier than methane from the gas stream. This condensation step, which may be regarded as extension of the gas/liquid contacting zone, further reduces mercury content of the vapor phase mercury-lean methane-rich gas to be liquefied in downstream cryogenic equipment.

The mercury-enriched hydrocarbon liquid recovered from the gas/liquid contactor is comprised principally of natural gas liquids (NGL) which may be burned as fuel, employed as feedstock for other processes, or, more usually, separated into component streams to recover $C_3/C_4$ mixtures for sale as LP gas. In most instances, it is desirable to recover a mercury-free liquid stream from the LPG unit for recycle to the primary absorber in order to augment liquid recovered from the overhead stream of the absorber. Mercury may be removed from liquid leaving the absorber by sorbents or other means but we prefer to chill the stream and settle out the mercury as a liquid or, most preferably, as a solid. A mercury separation unit of this type is simple, effective, and not very costly. If the mercury separation unit treats the entire stream recovered from the primary absorber to form a second mercury-free liquid, the LPG streams taken therefrom in a downstream separation unit will be essentially mercury-free. Accordingly, a normally gaseous recycle stream, preferably a $C_3/C_4$ mixture, can be taken from the LPG product streams and employed in liquid phase as part or all of the first mercury-free hydrocarbon liquid that is used for mercury removal in the gas/liquid contacting zone. If, on the other hand, mercury separation from the principal LP and light gasoline streams is not necessary, mercury may be separated from the normally gaseous recycle stream taken from the LPG unit and used as part or all of the first mercury-free hydrocarbon liquid.

In instances where gas treated in the absorber contains a significant amount of natural gas liquids and the choice of absorber temperature results in a vapor overhead stream of mercury-lean methane-rich gas containing significant amounts of recoverable gas liquids, gas liquids comprising propane and butane may be condensed therefrom, treated in a mercury separation unit, and employed as part or all of the first mercury-free hydrocarbon liquid. In this embodiment, it will usually not be necessary to recover a normally gaseous recycle stream from the mercury-enriched absorber effluent to augment the stream containing mercury-free condensed propane/butane.

In another embodiment of the invention, at least a major portion of the first mercury-free hydrocarbon liquid is normally liquid and the gas/liquid contacting zone is operated at a temperature between 40° C. and −40° C. When the natural gas treated is at pressure between 7 and 140 kg/cm$^2$ a and a temperature between 40° C. and −35° C., we prefer the mercury-free hydrocarbon liquid to be between 40° C. and −45° C.; the choice within that range being principally determined by the type of mercury separation unit employed and component freezing points of the normally liquid hydrocarbon. Preferably, the normal liquid will comprise principally gasoline, sometimes referred to as "lean oil", which is customarily separated from the wellhead gas. Recovery of the first mercury-free hydrocarbon liquid from the resulting mercury-enriched gasoline-containing stream is done substantially in the same manner as previously described, the principal difference being that an absorber overhead circuit is not required unless a very methane-rich stream is desired as the vapor overhead.

Referring to FIG. 1 which illustrates use of the process of the invention in an LNG production facility, natural gas having the following composition is pre-cooled to 0° C. by upstream propane chillers (not shown) and introduced to the system through line 1:

Methane: 88.5 mole percent,
$C_2$: 7.5 mole percent,
$C_3$: 2.5 mole percent,
$C_4$: 1.0 mole percent,
$C_5+$ : 0.5 mole percent,
Mercury: 10 μg/Nm$^3$.

The resulting stream is cooled in exchanger 2 to −23° C. and introduced to primary absorber 3 where contained mercury is absorbed into a first mercury-free liquid stream 4 comprised principally of ethane, propane, and butane which enters the absorber at a temperature of −37° C. Mercury-lean methane-rich gas leaves the absorber via line 5 and is combined with a mercury-free, normally gaseous recycle stream 6 comprised principally of propane and butane. The resulting mixed stream is cooled to −37° C. in heat exchanger 7 and introduced to vapor/liquid separator 8 where condensed $C_2+$ hydrocarbons from lines 5 and 6 are separated and pumped to the absorber through line 4 as the first mercury-free liquid stream having the following composition:

Methane: 28.0 mole percent,
$C_2$: 21.0 mole percent,
$C_3$: 20.0 mole percent,
$C_4$: 30.0 mole percent,
$C_5+$ : 1.0 mole percent,
Mercury: 1.4 ppb (molar).

In this embodiment, methane-rich stream 9 leaving separator 8 is substantially mercury-free and is introduced to downstream liquefaction facilities not shown. Obviously, not all of the methane-rich gas from the absorber need be liquefied and portions thereof may be taken for fuel use and/or pipeline transmission as gas.

From the absorber, a mercury-enriched hydrocarbon liquid is recovered in line 10 and introduced to mercury separation unit 11 which preferably employs the process scheme of FIG. 7. A second mercury-free hydrocarbon liquid is recovered from the mercury removal unit and introduced through line 12 to natural gas liquids (NGL) separation unit 13 from which light gasoline is recovered in line 14 and separated $C_1$-$C_4$ components are recovered through product lines collectively indicated as 15. A portion of one or more of the separated $C_2$-$C_4$ components is taken from the product lines through line 16 as normally gaseous recycle stream 16 and cooled to −29° C. in exchanger 17 for introduction to the absorber overhead circuit as a liquid through line 6. The choice of components of the normally gaseous recycle stream is determined largely by economics of a particular facility and may be any of available $C_2$-$C_5$ components. In general, we prefer use of a propane and butane blend.

Figure 2:
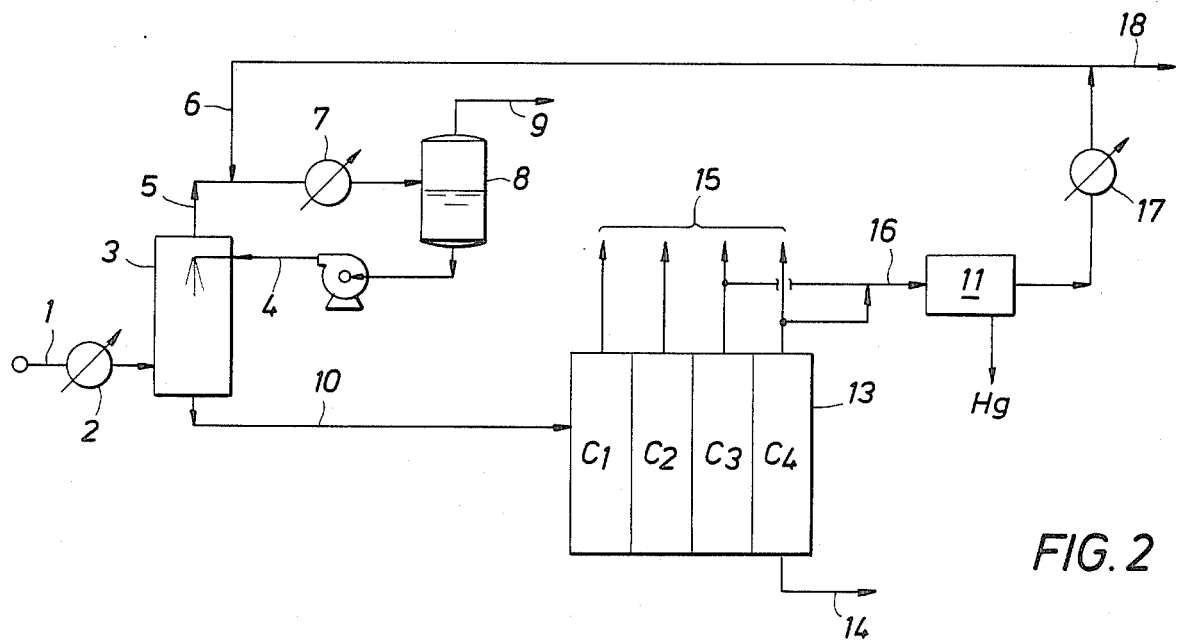
FIG. 2 is a flow scheme of another embodiment of the invention varying from FIG. 1 in that mercury is separated from a portion of the LPG product streams to form a recycle stream.

FIG. 2 illustrates a variation of the process scheme of FIG. 1 wherein mercury removal unit 11 treats the recycle stream 16 removed from the NGL facility 13. This arrangement is satisfactory where mercury content in product lines 14 and 15 are acceptable. Line 18 is for optional downstream reinjection of $C_3$/$C_4$ components into the liquefied natural gas product.

Figure 3:
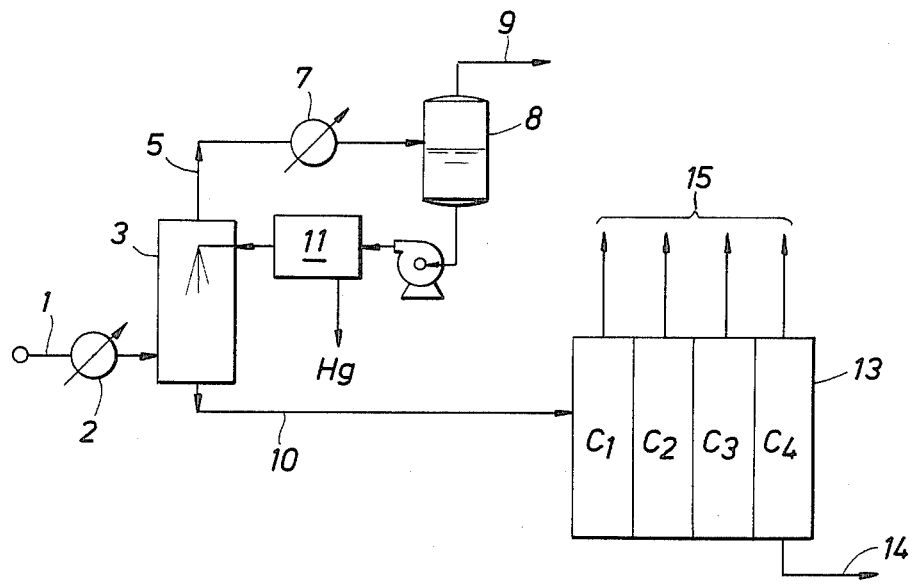
FIG. 3 is a flow scheme of another embodiment of the invention varying from FIG. 1 in that the first mercury-free hydrocarbon liquid is recovered entirely from vapor overhead of the gas/liquid contacting zone through an absorber recycle circuit including a mercury separation step.

FIG. 3 illustrates an embodiment of the invention in which the natural gas liquids content of the entering gas in line 1 is large enough to condense sufficient liquid from methane-rich gas in line 5 which is then treated in mercury removal unit 11 to separate mercury, preferably, in solid state and furnish the first mercury-free hydrocarbon liquid stream 4 to gas/liquid contactor 3. A recycle stream from the LPG unit is not employed. In this instance, sufficient $C_2+$ components are available to provide the necessary liquid flow rates in absorber 3.

The generalized flow schemes of FIGS. 1–3 are, as noted, quite suitable for use in LNG production facilities since the methane-rich gas sent to the liquefaction train through line 9 must have very low mercury content for cryogenic equipment. In LNG plants, a natural gas liquids (NGL) scrubbing column is customarily employed downstream of the initial, typically propane refrigerant, pre-cooling units for the purpose of separating natural gas liquids from methane to be liquefied. Typically, the scrubbing column will have an overhead temperature between −18° C. and −75° C. and a bottoms temperature between 15° C. and 65° C. Since the upper part of the scrubbing column is usually in the desired temperature range of the gas/liquid contacting zone of the invention, it may be conveniently and economically adapted to the additional function of mercury removal as we have described. It should, however, be observed that additional gas/liquid contacting takes place in and downstream of heat exchanger 7 through condensation of $C_2$ and heavier components in streams 5 and 6. This secondary contacting further reduces mercury content of the methane-rich gas recovered in line 9. Depending upon other aspects of the LNG facility design, heat exchanger 7 may, for example, be of falling film absorber design cooled by mixed refrigerant and, optionally, located on the downstream vapor side of separator 8. The heat exchanger and separator may, alternatively, be integrated into a single equipment item.

In the embodiment of for example FIG. 1, separator 8 is operated at $-37°$ C. which will reduce mercury content of the methane-rich gas to a level of about 0.1 $\mu$g/Nm$^3$. Most preferably, the column overhead circuit will be designed and operated in a manner that the separation zone corresponding to separator 8 will have a colder temperature between $-50°$ C. and $-75°$ C. in order to condense more liquids and thereby reduce mercury concentration in the methane-rich gas to between 0.01 and 0.001 $\mu$g/Nm$^3$.

FIG. 4 illustrates an embodiment of the invention in which the methane-rich product in line 9 may not be liquefied but, nevertheless, a mercury-lean gas is desired. This embodiment also illustrates use of a normally liquid hydrocarbon as principal constituent of the first mercury-free hydrocarbon liquid in line 4. In this instance, th entering gas is cooled to $-34°$ C. in exchanger 2 in order to enrich stream 10 with C, and lighter components. Following mercury removal in 11 and gas liquids separation in 13, a lean oil stream 14 having a molecular weight of 80 is recovered and chilled to $-37°$ C. in exchanger 19 for use as the first mercury-free hydrocarbon liquid. Excess liquid not needed in absorber 3 is recovered through line 20 as product or for other services.

FIG. 5 illustrates a variation of the process scheme of FIG. 4 wherein mercury removal unit 11 treats the recycle portion of stream 14 recovered from the LPG facility 13.

FIG. 6 also illustrates an embodiment of the invention using a normally liquid hydrocarbon as principal constituent of the first mercury-free hydrocarbon liquid in line 4 in the instance, for example, where mercury removal is desired for toxological rather than corrosion reasons. A typical instance is where a pipeline gas containing $C_2$ and $C_3$ components is desired and recovered through line 9 and separation of the absorber effluent liquid stream is not required. In this embodiment, the overhead gas in line 9 does not have to be cooled to cryogenic temperatures and the gas/liquid contacting zone may be operated between 40° C. and $-40°$ C.

FIG. 7 illustrates an embodiment of the invention with respect to mercury removal as a liquid or, preferably, as solids from mercury-contaminated liquid streams formed, for example, in the previously described embodiments. The mercury-contaminated hydrocarbon stream 21 is cooled to a temperature between $-18°$ C. and $-155°$ C. in exchangers 22 and 23 and introduced to separation zone 24 which may be a simple settling tank. Substantially mercury-free liquid is continuously withdrawn from the upper portion of the separator through line 25 while liquid or solid mercury is withdrawn, usually intermittently, through line 26.

The temperature to which the mercury-contaminated liquid stream is cooled will depend principally upon mercury removal requirements of the overall process, the specific choice of hydrocarbons for use in the first mercury-free hydrocarbon liquid stream and location of the mercury removal unit in the overall process. Since mercury solubility increases with rising temperature, it follows that a hydrocarbon liquid having very low mercury content may be obtained by very low temperature operation of the mercury removal unit described above. When the mercury separation step is employed on the liquid stream introduced to the primary absorber as shown for example in FIGS. 2 and 3, we prefer to separate mercury at a temperature between $-45°$ C. and $-160°$ C. When mercury is removed from relatively warmer absorber liquid effluent as for example in FIGS. 1, 4, and 10, the separation is made at a temperature between $-20°$ C. and $-100°$ C.

We claim:
1. A process for removing mercury from a natural gas stream which comprises:
   (a) contacting the natural gas stream in a gas/liquid contacting zone with a first mercury-free hydrocarbon liquid having a molecular weight between 20 and 130;
   (b) recovering a mercury-enriched hydrocarbon liquid from the gas/liquid contacting zone; and
   (c) recovering a mercury-lean methane-rich gas from the gas/liquid contacting zone;
   (d) recovering mercury from at least a portion of the mercury enriched hydrocarbon liquid.

2. The process of claim 1 wherein the gas/liquid contacting zone is operated within the temperature range between 10° C. and $-85°$ C. and at least a major portion of the first mercury-free hydrocarbon liquid is normally gaseous.

3. The process of claim 2 wherein the gas/liquid contacting zone is at a pressure between 17 and 105 kg/cm$^2$a and a temperature between 0° C. and $-75°$ C.

4. The process of claim 2 wherein the mercury-lean, methane-rich gas being recovered from the gas/liquid contacting zone is cooled to a temperature between $-30°$ C. and $-85°$ C., hydrocarbons heavier than methane are condensed therefrom and at least a major portion of the mercury-lean methane-rich gas is liquefied.

5. The process of claim 4 wherein mercury is separated from the resulting condensed hydrocarbons heavier than methane to form at least a portion of the first mercury-free hydrocarbon liquid.

6. The process of claim 2 or 4 wherein mercury is separated from the mercury-enriched hydrocarbon liquid to form a second mercury-free hydrocarbon liquid, a normally gaseous recycle stream is separated from the second mercury-free hydrocarbon liquid, and the first mercury-free hydrocarbon liquid contains at least a portion of the normally gaseous recycle stream.

7. The process of claim 2 or 4 wherein a normally gaseous recycle stream is separated from the mercury-enriched hydrocarbon liquid, mercury is separated from the normally gaseous recycle stream, and the first mercury-free hydrocarbon liquid contains at last a portion of the mercury-free normally gaseous recycle stream.

8. The process of claim 7 wherein the normally gaseous recycle stream is cooled to between $-45°$ C. and $-160°$ C. and mercury is separated therefrom.

9. The process of claim 1 wherein the gas/liquid contacting zone is operated within the temperature range between 40° C. and $-40°$ C. and at least a major portion of the first mercury-free hydrocarbon liquid is normally liquid.

10. The process of claim 8 wherein the gas/liquid contacting zone is at a pressure between 7 and 140 kg/cm$^2$a, the natural gas stream is at a temperature between 40° C. and $-35°$ C., and the first mercury-free hydrocarbon liquid is at a temperature between 40° C. and $-45°$ C.

11. The process of claim 9 wherein the mercury-enriched hydrocarbon liquid recovered from the gas/- liquid contacting zone comprises gasoline, a gasoline-containing stream is separated from the mercury-enriched hydrocarbon liquid and mercury is separated from at least a portion of the gasoline-containing stream to form the first mercury-free hydrocarbon liquid.

12. The process of claim 9 wherein the mercury-enriched hydrocarbon liquid recovered from the gas/liquid contacting zone comprises gasoline, mercury is separated from the mercury-enriched hydrocarbon liquid to form a second mercury-free hydrocarbon liquid, and the first mercury-free hydrocarbon liquid contains a portion of the second mercury-free hydrocarbon liquid.

13. The process of claim 9 wherein the mercury-enriched hydrocarbon liquid recovered from the gas/liquid contacting zone comprises gasoline, mercury is separated from the mercury-enriched hydrocarbon liquid to form a second mercury-free hydrocarbon liquid, a gasoline-containing stream is separated from the second mercury-free hydrocarbon liquid, and the first mercury-free hydrocarbon liquid contains at least a portion of the separated gasoline-containing stream.

14. The process of claim 1, or 13 wherein mercury is separated from the mercury-enriched hydrocarbon liquid recovered from the gas/liquid contacting zone at a temperature between $-20°$ C. and $-100°$ C.

* * * * *